US009218106B2

(12) United States Patent
Malik

(10) Patent No.: US 9,218,106 B2
(45) Date of Patent: Dec. 22, 2015

(54) INTERACTIVE PROGRAM MANAGER AND METHODS FOR PRESENTING PROGRAM CONTENT

(71) Applicant: AT&T Intellectual Property I, L.P., Atlanta, GA (US)

(72) Inventor: Dale Malik, Atlanta, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 318 days.

(21) Appl. No.: 13/769,570

(22) Filed: Feb. 18, 2013

(65) Prior Publication Data

US 2013/0227491 A1    Aug. 29, 2013

Related U.S. Application Data

(63) Continuation of application No. 11/350,244, filed on Feb. 8, 2006, now Pat. No. 8,402,503.

(51) Int. Cl.
| | |
|---|---|
| *G06F 3/048* | (2013.01) |
| *G06F 3/0482* | (2013.01) |
| *H04N 7/173* | (2011.01) |
| *H04N 21/41* | (2011.01) |
| *H04N 21/45* | (2011.01) |

(Continued)

(52) U.S. Cl.
CPC .......... *G06F 3/0482* (2013.01); *H04N 7/17318* (2013.01); *H04N 21/4122* (2013.01); *H04N 21/4532* (2013.01); *H04N 21/466* (2013.01); *H04N 21/4667* (2013.01); *H04N 21/4668* (2013.01); *H04N 21/4826* (2013.01)

(58) Field of Classification Search
CPC ..................................................... G06F 3/0482
USPC ............................................................ 715/841
See application file for complete search history.

(56) References Cited

U.S. PATENT DOCUMENTS

| 3,798,610 A | 3/1974 | Bliss |
| 3,886,302 A | 5/1975 | Kosco |
| 4,130,833 A | 12/1978 | Chomet |

(Continued)

FOREIGN PATENT DOCUMENTS

| EP | 1117257 A2 | 7/2001 |
| WO | 9414284 | 6/1994 |

(Continued)

OTHER PUBLICATIONS

"Building a Switched Broadcast Network", Access Intelligence LLC; Nov. 15, 2005; 5 pages.

(Continued)

*Primary Examiner* — William Titcomb
(74) *Attorney, Agent, or Firm* — Toler Law Group, PC

(57) ABSTRACT

A particular system includes a processor and memory storing instructions that are executable by the processor to cause the processor to perform operations. The operations include sending a notification indicator to a first device in response to identifying content of interest associated with a first source. The operations also include, in response to user input responsive to the notification indicator, sending a menu display to the first device. The menu display includes a first user selectable option to view a submenu. The submenu includes an option to selectively enable display of an alert associated with the first source. The alert is displayable on the first device in conjunction with display of a first program.

20 Claims, 7 Drawing Sheets

(51) Int. Cl.
*H04N 21/466* (2011.01)
*H04N 21/482* (2011.01)

(56) References Cited

U.S. PATENT DOCUMENTS

| | | | |
|---|---|---|---|
| 4,258,386 A | 3/1981 | Cheung |
| 4,264,925 A | 4/1981 | Freeman |
| 4,361,851 A | 11/1982 | Asip |
| 4,476,488 A | 10/1984 | Merrell |
| 4,488,179 A | 12/1984 | Kruger |
| 4,536,791 A | 8/1985 | Campbell et al. |
| 4,566,030 A | 1/1986 | Nickerson |
| 4,567,591 A | 1/1986 | Gray |
| 4,573,072 A | 2/1986 | Freeman |
| 4,598,288 A | 7/1986 | Yarbrough |
| 4,688,248 A | 8/1987 | Tomizawa |
| 4,689,661 A | 8/1987 | Barbieri |
| 4,698,670 A | 10/1987 | Matty |
| 4,720,873 A | 1/1988 | Goodman |
| 4,816,904 A | 3/1989 | Mckenna |
| 4,862,268 A | 8/1989 | Campbell |
| 4,890,322 A | 12/1989 | Russell, Jr. |
| 4,890,332 A | 12/1989 | Takahashi |
| 4,912,552 A | 3/1990 | Allison |
| 4,939,509 A | 7/1990 | Bartholomew et al. |
| 4,977,455 A | 12/1990 | Young |
| 5,010,585 A | 4/1991 | Garcia |
| 5,010,858 A | 4/1991 | Schierling |
| 5,038,211 A | 8/1991 | Hallenbeck |
| 5,046,090 A | 9/1991 | Walker |
| 5,046,092 A | 9/1991 | Walker |
| 5,055,924 A | 10/1991 | Skutta |
| 5,161,019 A | 11/1992 | Emanuel |
| 5,173,900 A | 12/1992 | Miller |
| 5,181,438 A | 1/1993 | Wellman |
| 5,191,645 A | 3/1993 | Carlucci |
| 5,208,665 A | 5/1993 | McCalley |
| 5,247,347 A | 9/1993 | Litteral |
| 5,249,044 A | 9/1993 | Von Kohorn |
| 5,260,778 A | 11/1993 | Kauffman |
| 5,262,860 A | 11/1993 | Fitzpatrick |
| 5,287,181 A | 2/1994 | Holman |
| 5,305,195 A | 4/1994 | Murphy |
| 5,335,277 A | 8/1994 | Harvey |
| 5,339,315 A | 8/1994 | Maeda |
| 5,343,240 A | 8/1994 | Yu |
| 5,357,276 A | 10/1994 | Banker |
| 5,374,951 A | 12/1994 | Welsh |
| 5,390,027 A | 2/1995 | Henmi |
| 5,404,393 A | 4/1995 | Remillard |
| 5,444,499 A | 8/1995 | Saitoh |
| 5,446,490 A | 8/1995 | Blahut |
| 5,446,919 A | 8/1995 | Wilkins |
| 5,448,568 A | 9/1995 | Delpuch et al. |
| 5,481,542 A | 1/1996 | Logston |
| 5,483,277 A | 1/1996 | Granger |
| 5,502,499 A | 3/1996 | Birch |
| 5,539,451 A | 7/1996 | Carey |
| 5,539,822 A | 7/1996 | Lett |
| 5,541,662 A | 7/1996 | Adams et al. |
| 5,541,917 A | 7/1996 | Farris |
| 5,555,838 A | 9/1996 | Bergman |
| 5,557,320 A | 9/1996 | Krebs |
| 5,557,338 A | 9/1996 | Maze |
| 5,564,073 A | 10/1996 | Takahisa |
| 5,585,838 A | 12/1996 | Lawler |
| 5,585,858 A | 12/1996 | Harper |
| 5,592,477 A | 1/1997 | Farris et al. |
| 5,592,551 A | 1/1997 | Lett et al. |
| 5,600,775 A | 2/1997 | King |
| 5,608,448 A | 3/1997 | Smora |
| 5,629,733 A | 5/1997 | Youman |
| 5,640,192 A | 6/1997 | Garfinkle |
| 5,648,824 A | 7/1997 | Dunn |
| 5,661,517 A | 8/1997 | Budow |
| 5,721,829 A | 2/1998 | Dunn |
| 5,732,219 A | 3/1998 | Blumer et al. |
| 5,774,664 A | 6/1998 | Hidary et al. |
| 5,779,549 A | 7/1998 | Walker |
| 5,781,246 A | 7/1998 | Alten |
| 5,784,683 A | 7/1998 | Sistanizadeh |
| 5,796,426 A | 8/1998 | Gullichsen |
| 5,797,001 A | 8/1998 | Augenbraun et al. |
| 5,805,154 A | 9/1998 | Brown |
| 5,818,438 A | 10/1998 | Howe et al. |
| 5,820,459 A | 10/1998 | Acres et al. |
| 5,822,123 A | 10/1998 | Davis |
| 5,828,420 A | 10/1998 | Marshall |
| 5,847,771 A | 12/1998 | Cloutier |
| 5,864,823 A | 1/1999 | Levitan |
| 5,867,205 A | 2/1999 | Harrison |
| 5,867,688 A | 2/1999 | Simmon et al. |
| 5,880,768 A | 3/1999 | Lemmons |
| 5,880,769 A | 3/1999 | Nemirofsky |
| 5,892,508 A | 4/1999 | Howe et al. |
| 5,929,931 A | 7/1999 | Hoekstra |
| 5,931,908 A | 8/1999 | Gerba |
| 5,977,964 A | 11/1999 | Williams et al. |
| 5,990,927 A | 11/1999 | Hendricks et al. |
| 6,005,561 A | 12/1999 | Hawkins |
| 6,008,802 A | 12/1999 | Iki et al. |
| 6,012,983 A | 1/2000 | Walker |
| 6,018,764 A | 1/2000 | Field |
| 6,025,837 A | 2/2000 | Matthews |
| 6,100,883 A | 8/2000 | Hoarty |
| 6,108,042 A | 8/2000 | Adams |
| 6,113,495 A | 9/2000 | Walker |
| 6,144,402 A | 11/2000 | Norsworthy et al. |
| 6,157,413 A | 12/2000 | Hanafee |
| 6,201,536 B1 | 3/2001 | Hendricks |
| 6,213,880 B1 | 4/2001 | Sim |
| 6,230,172 B1 | 5/2001 | Purnaveja |
| 6,240,555 B1 | 5/2001 | Shoff |
| 6,244,957 B1 | 6/2001 | Walker |
| 6,256,785 B1 | 7/2001 | Klappert |
| 6,279,112 B1 | 8/2001 | O'Toole, Jr. et al. |
| 6,292,210 B1 | 9/2001 | Gerszberg et al. |
| 6,298,482 B1 | 10/2001 | Seidman et al. |
| 6,317,885 B1 | 11/2001 | Fries |
| 6,324,544 B1 | 11/2001 | Alam |
| 6,324,694 B1 | 11/2001 | Watts |
| 6,327,574 B1 | 12/2001 | Kramer |
| 6,349,410 B1 | 2/2002 | Lortz |
| 6,357,042 B2 | 3/2002 | Srinivasan |
| 6,363,525 B1 | 3/2002 | Dougherty et al. |
| 6,400,996 B1* | 6/2002 | Hoffberg et al. ............... 700/83 |
| 6,418,556 B1 | 7/2002 | Bennington |
| 6,419,137 B1 | 7/2002 | Marshall |
| 6,463,207 B1 | 10/2002 | Abecassis |
| 6,463,585 B1 | 10/2002 | Hendricks |
| 6,463,858 B2 | 10/2002 | Weber et al. |
| 6,468,155 B1 | 10/2002 | Zucker |
| 6,477,579 B1 | 11/2002 | Kunkel |
| 6,483,986 B1 | 11/2002 | Krapf |
| 6,490,725 B2 | 12/2002 | Kikinis |
| 6,491,651 B1 | 12/2002 | Leahy et al. |
| 6,502,242 B1 | 12/2002 | Howe et al. |
| 6,505,169 B1 | 1/2003 | Bhagavath et al. |
| 6,535,889 B1 | 3/2003 | Headrick |
| 6,557,006 B1 | 4/2003 | Headrick |
| 6,564,246 B1 | 5/2003 | Varma et al. |
| 6,567,982 B1 | 5/2003 | Howe et al. |
| 6,571,392 B1 | 5/2003 | Zigmond et al. |
| 6,615,408 B1 | 9/2003 | Kaiser |
| 6,634,942 B2 | 10/2003 | Walker |
| 6,676,522 B2 | 1/2004 | Rowe |
| 6,701,437 B1 | 3/2004 | Hoke et al. |
| 6,704,930 B1 | 3/2004 | Eldering et al. |
| 6,718,551 B1 | 4/2004 | Swix et al. |
| 6,738,978 B1 | 5/2004 | Hendricks |
| 6,754,904 B1 | 6/2004 | Cooper et al. |
| 6,756,997 B1 | 6/2004 | Ward, III et al. |
| 6,760,916 B2 | 7/2004 | Holtz |
| 6,800,029 B2 | 10/2004 | Rowe |

(56) References Cited

U.S. PATENT DOCUMENTS

| | | |
|---|---|---|
| 6,820,277 B1 | 11/2004 | Eldering et al. |
| 6,826,775 B1 | 11/2004 | Howe et al. |
| 6,850,252 B1 | 2/2005 | Hoffberg |
| 6,886,178 B1 | 4/2005 | Mao et al. |
| 6,898,762 B2 | 5/2005 | Ellis |
| 6,967,566 B2 | 11/2005 | Weston |
| 7,079,176 B1 | 7/2006 | Freeman et al. |
| 7,100,183 B2 | 8/2006 | Kunkel |
| 7,237,253 B1 | 6/2007 | Blackketter |
| 7,249,321 B2 | 7/2007 | Bushey |
| 7,266,832 B2 | 9/2007 | Miller |
| 7,266,835 B2 | 9/2007 | Halbert |
| 7,283,845 B2 * | 10/2007 | De Bast ............... 455/566 |
| 7,284,032 B2 | 10/2007 | Weber |
| 7,290,222 B2 * | 10/2007 | Guido et al. ............. 715/853 |
| 7,292,774 B1 | 11/2007 | Masters et al. |
| 7,293,276 B2 | 11/2007 | Phillips |
| 7,302,696 B1 | 11/2007 | Yamamoto |
| 7,320,134 B1 | 1/2008 | Tomsen et al. |
| 7,337,457 B2 | 2/2008 | Pack |
| 7,378,954 B2 * | 5/2008 | Wendt ............... 340/539.11 |
| 7,434,247 B2 | 10/2008 | Dudkiewicz et al. |
| 7,437,749 B1 | 10/2008 | Smith et al. |
| 7,444,659 B2 | 10/2008 | Lemmons |
| 7,624,357 B2 * | 11/2009 | De Bast ............... 715/828 |
| 7,634,787 B1 | 12/2009 | Gebhardt et al. |
| 7,849,226 B2 | 12/2010 | Zigmond et al. |
| 7,882,530 B2 | 2/2011 | Ducheneaut et al. |
| 7,895,530 B2 * | 2/2011 | Leavitt et al. ............... 715/810 |
| 8,166,498 B2 | 4/2012 | Walter |
| 8,282,476 B2 | 10/2012 | Walter |
| 8,317,618 B2 | 11/2012 | Malik |
| 8,365,218 B2 | 1/2013 | Walter et al. |
| 8,370,763 B1 | 2/2013 | Moore et al. |
| 8,402,503 B2 * | 3/2013 | Malik ............... 725/135 |
| 8,418,196 B2 | 4/2013 | Gray et al. |
| 2001/0016943 A1 | 8/2001 | Maas et al. |
| 2001/0054134 A1 | 12/2001 | Nagatomo et al. |
| 2002/0056093 A1 | 5/2002 | Kunkel |
| 2002/0056129 A1 | 5/2002 | Blackketter et al. |
| 2002/0059586 A1 | 5/2002 | Carney et al. |
| 2002/0059644 A1 | 5/2002 | Andrade et al. |
| 2002/0069132 A1 | 6/2002 | Perkes |
| 2002/0083464 A1 | 6/2002 | Tomsen |
| 2002/0083469 A1 | 6/2002 | Jeannin |
| 2002/0087402 A1 | 7/2002 | Zustak |
| 2002/0087988 A1 | 7/2002 | Lipscomb et al. |
| 2002/0124252 A1 | 9/2002 | Schaefer et al. |
| 2002/0132585 A1 | 9/2002 | Palermo et al. |
| 2002/0138561 A1 | 9/2002 | Chatfield et al. |
| 2002/0147984 A1 | 10/2002 | Tomsen |
| 2002/0147988 A1 | 10/2002 | Nakano |
| 2002/0156870 A1 | 10/2002 | Borournand |
| 2002/0157099 A1 | 10/2002 | Schrader et al. |
| 2002/0162121 A1 | 10/2002 | Mitchell |
| 2002/0164155 A1 | 11/2002 | Mate |
| 2003/0005437 A1 | 1/2003 | Feuer et al. |
| 2003/0005448 A1 | 1/2003 | Axelsson et al. |
| 2003/0018969 A1 | 1/2003 | Humpleman |
| 2003/0037332 A1 | 2/2003 | Chapin et al. |
| 2003/0051238 A1 | 3/2003 | Barone, Jr. |
| 2003/0067544 A1 | 4/2003 | Wada |
| 2003/0070167 A1 | 4/2003 | Holtz |
| 2003/0088612 A1 | 5/2003 | Goldschmidt Iki et al. |
| 2003/0088872 A1 | 5/2003 | Maissel et al. |
| 2003/0088875 A1 | 5/2003 | Gay et al. |
| 2003/0093790 A1 | 5/2003 | Logan et al. |
| 2003/0110171 A1 | 6/2003 | Ozer |
| 2003/0110499 A1 | 6/2003 | Knudson |
| 2003/0111742 A1 | 6/2003 | Iwasaki et al. |
| 2003/0117445 A1 | 6/2003 | Hendricks et al. |
| 2003/0121051 A1 | 6/2003 | Howe et al. |
| 2003/0145323 A1 | 7/2003 | Hendricks |
| 2003/0149975 A1 | 8/2003 | Eldering |
| 2003/0159142 A1 | 8/2003 | Howe et al. |
| 2003/0163828 A1 | 8/2003 | Agnihotri |
| 2003/0182567 A1 | 9/2003 | Barton |
| 2003/0182663 A1 | 9/2003 | Gudorf et al. |
| 2003/0188317 A1 | 10/2003 | Liew et al. |
| 2003/0204847 A1 | 10/2003 | Ellis |
| 2003/0208754 A1 | 11/2003 | Sridhar |
| 2003/0233650 A1 | 12/2003 | Zaner et al. |
| 2003/0233656 A1 | 12/2003 | Sie |
| 2003/0235407 A1 | 12/2003 | Lord |
| 2004/0003402 A1 | 1/2004 | McKenna |
| 2004/0006509 A1 | 1/2004 | Mannik |
| 2004/0012717 A1 | 1/2004 | Sprague et al. |
| 2004/0021403 A1 | 2/2004 | Ayazi |
| 2004/0034873 A1 | 2/2004 | Zenoni |
| 2004/0045028 A1 | 3/2004 | Harris |
| 2004/0049785 A1 | 3/2004 | Grzeczkowski et al. |
| 2004/0098754 A1 | 5/2004 | Vella |
| 2004/0103032 A1 | 5/2004 | Maggio |
| 2004/0108776 A1 | 6/2004 | Horng et al. |
| 2004/0111741 A1 | 6/2004 | DePietro |
| 2004/0111742 A1 | 6/2004 | Hendricks |
| 2004/0117819 A1 | 6/2004 | Yu |
| 2004/0122731 A1 | 6/2004 | Mannik |
| 2004/0163101 A1 | 8/2004 | Swix |
| 2004/0168188 A1 | 8/2004 | Bennington |
| 2004/0194138 A1 | 9/2004 | Boylan |
| 2004/0220858 A1 | 11/2004 | Maggio |
| 2004/0235567 A1 | 11/2004 | Chatani |
| 2004/0243470 A1 | 12/2004 | Ozer |
| 2004/0243623 A1 | 12/2004 | Ozer |
| 2004/0261127 A1 | 12/2004 | Freeman |
| 2004/0268385 A1 | 12/2004 | Gray et al. |
| 2004/0268401 A1 | 12/2004 | Gray et al. |
| 2004/0268404 A1 | 12/2004 | Gray et al. |
| 2004/0268416 A1 | 12/2004 | Gray et al. |
| 2004/0268417 A1 | 12/2004 | Gray et al. |
| 2004/0268418 A1 | 12/2004 | Gray et al. |
| 2005/0005303 A1 | 1/2005 | Barone, Jr. et al. |
| 2005/0021403 A1 | 1/2005 | Ozer et al. |
| 2005/0086688 A1 | 4/2005 | Omoigui |
| 2005/0091111 A1 | 4/2005 | Green |
| 2005/0097599 A1 | 5/2005 | Plotnick |
| 2005/0102635 A1 * | 5/2005 | Jiang et al. ............... 715/851 |
| 2005/0108776 A1 | 5/2005 | Carver |
| 2005/0114906 A1 | 5/2005 | Hoarty |
| 2005/0132291 A1 | 6/2005 | Wagner et al. |
| 2005/0132401 A1 | 6/2005 | Boccon-Gibod et al. |
| 2005/0138668 A1 | 6/2005 | Gray et al. |
| 2005/0181878 A1 | 8/2005 | Danieli et al. |
| 2005/0193425 A1 | 9/2005 | Sull et al. |
| 2005/0196139 A1 | 9/2005 | Blackketter |
| 2005/0204030 A1 | 9/2005 | Koch |
| 2005/0204385 A1 | 9/2005 | Sull |
| 2005/0216932 A1 | 9/2005 | Danker |
| 2005/0235318 A1 | 10/2005 | Grauch |
| 2005/0251820 A1 | 11/2005 | Stefanik |
| 2005/0262530 A1 | 11/2005 | Ruetschi et al. |
| 2005/0262542 A1 | 11/2005 | DeWeese |
| 2005/0267809 A1 | 12/2005 | Zheng |
| 2005/0267810 A1 | 12/2005 | Zheng |
| 2005/0267820 A1 | 12/2005 | Zheng |
| 2005/0273809 A1 | 12/2005 | Kendall et al. |
| 2006/0010476 A1 | 1/2006 | Kelly |
| 2006/0053049 A1 | 3/2006 | Nolan |
| 2006/0063590 A1 | 3/2006 | Abassi et al. |
| 2006/0068911 A1 | 3/2006 | Pirich et al. |
| 2006/0075430 A1 | 4/2006 | Park |
| 2006/0075432 A1 | 4/2006 | Abbadessa et al. |
| 2006/0087987 A1 | 4/2006 | Witt |
| 2006/0101499 A1 | 5/2006 | Aravamudan et al. |
| 2006/0143653 A1 | 6/2006 | Suh |
| 2006/0154710 A1 | 7/2006 | Serafat |
| 2006/0154725 A1 | 7/2006 | Glaser et al. |
| 2006/0161950 A1 | 7/2006 | Imai et al. |
| 2006/0190966 A1 | 8/2006 | McKissick et al. |
| 2006/0200842 A1 * | 9/2006 | Chapman et al. ............... 725/34 |
| 2006/0294568 A1 | 12/2006 | Walter |
| 2006/0294572 A1 | 12/2006 | Walter |
| 2007/0067805 A1 | 3/2007 | Macrae |

(56) References Cited

U.S. PATENT DOCUMENTS

| | | |
|---|---|---|
| 2007/0094702 A1 | 4/2007 | Khare et al. |
| 2007/0107035 A1 | 5/2007 | Howe |
| 2007/0124763 A1 | 5/2007 | Ellis |
| 2007/0124795 A1 | 5/2007 | McKissick et al. |
| 2007/0136773 A1 | 6/2007 | O'Neil |
| 2007/0150338 A1 | 6/2007 | Malik |
| 2007/0155506 A1 | 7/2007 | Malik |
| 2007/0157235 A1 | 7/2007 | Teunissen |
| 2007/0168884 A1 | 7/2007 | Weeks |
| 2007/0186269 A1 | 8/2007 | Malik |
| 2007/0208766 A1 | 9/2007 | Malik |
| 2008/0155616 A1 | 6/2008 | Logan et al. |
| 2008/0212941 A1 | 9/2008 | Lillethun et al. |
| 2009/0069038 A1 | 3/2009 | Olague et al. |
| 2012/0331503 A1 | 12/2012 | Gray et al. |
| 2013/0012318 A1 | 1/2013 | Walter |
| 2013/0079127 A1 | 3/2013 | Malik |
| 2013/0079129 A1 | 3/2013 | Walter et al. |
| 2013/0254818 A1 | 9/2013 | Gray et al. |
| 2015/0095853 A1* | 4/2015 | Hoerentrup et al. .......... 715/841 |

FOREIGN PATENT DOCUMENTS

| | | | |
|---|---|---|---|
| WO | 02086746 | A1 | 10/2002 |
| WO | 03085982 | A2 | 10/2003 |
| WO | 2004053732 | A2 | 6/2004 |

OTHER PUBLICATIONS

"Building Dynamic Content for Set-Top Boxes", Sun Microsystems; 1994-2005; 4 pages.
"Building the Perfect on Demand Beast: Television on Demand Presents a Dizzyling Array of Technology Options", Reed Business Information; Nov. 3, 2003; 6 pages.
"Chips: Motorola's Scorpion Chip Turns TV Info Interactive Information Appliance", Work Group Computing Report; Aug. 11, 1997; 3 pages.
"Columbia Tri-Star Television Distribution and Microsoft Sponsor Development Competition for Interactive Television", Microsoft Press Pass; Jan. 25, 2000; 2 pages.
"En Reach Technology, Inc. Demonstrates Next Generation of Interactive Television with Innovative Open PVR Soloution", EnReach Technology, Inc., PRNewswire.com; Sep. 1996-2006; 2 pages.
"EnterVideo-on-Demand", Electronic News; Aug. 31, 1998; 3 pages.
"Knightrider TV Intro Theme", IMBd.com, Inc; Mar. 18, 2009; 7 pages.
"Liberate Technologies Completes Assessment Aboard Scientific-Atlanta Explorer Set Tops and Digital Interactive Network", Liberate Technologies Press; May 2, 2002; 2 pages.
"Next-Generation Digital Video Network Intelligent IP Infrastructure Solutions for Cable Operators Offering VoD Services", Reed Business Information; Feb. 2004; 8 pages.
"PBS Debuts Another First in Interactive Television; Wavexpress Selected to Provide Digital Broadcasting Platform", Market Wire; Feb. 28, 2001; 3 pages.
"PENTV: BBC Achieves Significant Interactive TV Audiences with Open TV", Aug. 13, 2001; 2 pages.
"Set-Top Survival", Electronics Weekly; May 22, 2002; 3 pages.
"Successfully Marketing Television on Demand: Operators, Programmers Look to Drive VOD Usage Through Promotions, Improved Navigation", Reed Business Information ISSN: 00072028; Nov. 22, 2004; 4 pages.
"Time Warner Introduces World's First Full Service Network in Orlando: Network offers First Digital Interactive Service Including Movies on Demand, Home Shopping and Interactive Games", Business Wire; Dec. 14, 1994; 3 pages.
"Video on the Move", Reed Business Information; Aug. 14, 2000; 2 pages.

"Worldgate Set to Deliver GO TV Links for Dynamic Interactive TV", Advanstar Communications, Inc; Oct. 22, 2002; 1 page.
"Zap2it.com: TV Listings Frequently Asked Questions", http://web.archive.org/web/20000903002526/www.zap2it.eom/index/1,1146,4_1_0_000,FF.html; 3 pages.
Berkowitz, Ben, "Developers Interactinv With Sony Set-Top Box", Cable Worlds; May 21, 2001; 3 pages.
Bissell, R. A. et al., "The Set-Top Boxes for Interactive Services", BT Technology J., vol. 13, No. 4; Oct. 1995; 12 pages.
Carey, John, "Contents and Service for the New Digital TV Environment", 23 pages.
Cauley, Leslie, "Microsoft, Baby Bell Form Video Alliance,", The Wall Street Journal, Sep. 26, 1994; 2 pages.
Chorianopoulos, Konstantinos, "The Digital Set-Top Box as a Virtual Channel Provider", Dept. of Management Science and Technology, Athens University of Economics; Apr. 2003; 2 pages.
Short, David, "A Quick Guide to Interactive Television", Broadcasting Engineering; Feb. 2005; 3 pages.
Dransfeld, Henning, "Interactive TV and Formula One a Strategic Issue for Engine Suppliers", European Business Review; 1999; 8 pages.
Droitcourt, J L, "Understanding How Interactive Television Set-Top Box Works . . . And What it will Mean to the Customer", International Broadcasting Convention; Sep. 14-18, 1995; 13 pages.
Elmer-Dewitt, Phillip, "Play . . . Fast Forward . . . Rewind . . . Pause U.S. Firms Want to Wire America for Two-Way TV, but their Systems Are Not Ready for Prime Time", Time Archive; May 23, 1994; 4 pages.
Elmer-Dewitt, Phillip, "Ready for Prime Time?", Time Archive; Dec. 26, 1994; 3 pages.
Grant, Peter, "On-Demand TV Expands via Underused Fiber Highways", Wall Street Journal; Dec. 17, 2004; 4 pages.
Greenwald, John, "Battle for Remote Control", Time Archive; Mar. 1, 1995; 4 pages.
Hodge, Winston, "Architecture to Deliver Video on Demand", Electronic Business Buyer; Nov. 1994; 2 pages.
Jain, Sanjay K et al., "Video on Demand: An Overview", A Central University; Feb. 2003; 7 pages.
Keough, Christopher, "Interactive TV Connection-Technology—Gold Pocket Interactive Acquires Mixed Signals Technologies", Los Angeles Business Journal; Mar. 4, 2002; 2 pages.
Leban, M. et al., "Internet Search for TV Content Based on TV Anytime", Sep. 22-24, 2003; 1 page.
Lin, et al., "The Influence of Network Branding on Audience Affinity for Network Television", Advertising Research Foundation; Feb. 2004; 20 pages.
Loizides, "Interactive TV: Dispelling Misconceptions in the Media", Acm Computers in Entertainment, vol. 3, No. 1, Article 7a; Jan. 2005; 5 pages.
Mermigas, Diane, "NBC Taking TV's Future by the Reins With On-Demand Content, Delivery", Television Week; Sep. 15, 2003; 4 pages.
Srivastava, H. O. et al, "On-Line Broadcast Archives for Interactive Video", 1997; 21 pages.
Verhoeven, Jan L et al., "System Architecture for Experimental Interactive Television", LogicaCMG Nederland B.V.; 4 pages.
Waterman, David, "Internet TV: Business Models and Program Content", Dept. of Telecommunications Radio and TV Center; Sep. 2001; 27 pages.
Zollman, Peter M, "Interactive Television", http:/www.rtnda.org/resources/intnews/arttv.htm; Jan. 6, 2006; 9 pages.
US 5,787,683, 7/1998, Sistanizadeh et al. (withdrawn).
IP Packet Structure, Connected: An Internet Encyclopedia, Jan. 1998, Accessed Jan. 6, 2010, http://web.archive.org/web/19980118170657/http://www.freesoft.org/CIE/Course/Section3/7.htm, 5 pages.
U.S. Appl. No. 13/790,777 entitled "Interactive Content with Enhanced Network Operator Control", filed Mar. 8, 2013.
U.S. Appl. No. 13/919,425 entitled "System and Method for Providing Television Services", filed Jun. 17, 2013.

(56) References Cited

OTHER PUBLICATIONS

Fennis, B. et al., "Stay Tuned: We Will Be Back Right after These Messages": Need to Evaluate Moderates the Transfer of Irritation in Advertising, Journal of Advertising, vol. 30, No. 3 (Autumn, 2001), M. E. Sharpe, Inc., p. 15-25.

Olsen et al., "TiVo looks to tune in to advertisers", CNET News, Mar. 23, 2004, 3 pages.

Schroeter, R. et al., "Vannotea—A Collaborative Video Indexing, Annotation and Discussion System for Broadband Networks", Knowledge Markup and Semantic Annotation Workshop, K-CAP 2003. Sanibel, Florida. Oct. 2003, Accessed on Jul. 22, 2009 at http://www.itee.uq.edu.au/~eresearch/papers/2003/schroeter-kcap03.pdf, 8 pages.

Schroeter, R., "Collaborative Video Indexing, Annotation and Discussion over High-Bandwidth Networks", Master's Thesis, School of ITEE, University of Queensland, Mar. 31, 2004, accessed on Jul. 22, 2009 at http://www.itee.uq.edu.au/~eresearch/projects/vannotea/pub/MastersThesis_RonaldSchroeter.pdf, 100 pages.

Nintendo Gamecube™, WaveBird™ Wireless Controller, "http://www.nintendo.com/consumer/downloads/ wave_english.pdf", Nintendo, 2003, 2 pages.

\* cited by examiner

INTERACTIVE PROGRAM MANAGER AND METHODS FOR PRESENTING PROGRAM CONTENT

CLAIM OF PRIORITY

The present application is a continuation of, and claims priority from, U.S. patent application Ser. No. 11/350,244, filed Feb. 8, 2006 and entitled "Interactive Program Manager and Methods for Presenting Program Content," which is hereby incorporated by reference in its entirety.

BACKGROUND

Television users are presently able to access hundreds of channels providing a multitude of programs, only a small fraction of which will be of interest to a given user. To assist the user in determining programs of interest, current commercially available reception devices such as televisions, analog cable receivers, and digital cable and satellite receivers typically provide a program guide function that allows the user to access a grid showing programs that will be available on various channels in upcoming time slots. Brief descriptions of programs may also be accessible. Such receivers may also allow the user to search for programs in basic categories such as news, sports, movies, etc.

Current commercially available television recording technology also provides similar tools. For example, digital video recording machines, which typically store video on a bulk storage device such as a hard disk drive, allow users to select programs for recording using an on screen program guide that provides keyword searching of program titles, a program time grid, and basic program categorization.

Although these devices provide tools that improve over devices of earlier generations, these devices do not adequately address at least two situations. First, these devices fail to keep a user in touch with breaking news, local weather alerts, and program content that might be of interest when other program content is being viewed. Thus, these devices can create a dangerous situation for a user that is left unaware of a local severe weather alert, an evacuation order, or the like.

In addition, these devices tend to capture or identify too large of a result set when attempting to identify content that should be of interest to a user. As a result, these conventional tools still require users to examine upcoming programs to identify programs of interest. Thus, developers of the next generation of devices are focused on providing intelligence in receiving and recording devices for identifying programs of interest on behalf of the user.

Despite the development of multiple approaches to provide improved program guides to a user there is still a need for improved approaches for keeping a user informed of available program content whether or not the user is presently viewing a program from a content provider.

SUMMARY

Embodiments of a multimedia system for use with a monitor comprise a receiver, a controller and an analyzer. The receiver receives both broadcast and non-broadcast sources of multimedia content and presents the content via the monitor. The controller directs the receiver to select a first channel and forwards a second channel different from the first channel to a device other than the monitor. An analyzer in communication with the receiver monitors a program guide and at least the second channel for content of interest in accordance with a user profile. The analyzer communicates information via the receiver and the monitor in response to an operator input.

An embodiment of a method for interactively selecting program content comprises analyzing a program guide in response to a user profile to identify alternative content, providing a mechanism that enables a user to explore the alternative content, wherein exploration of the alternative content comprises a multiple level interactive menu and providing a mechanism that enables a user to direct the alternative content to a select device.

Other systems, methods, features and advantages will be or will become apparent to one with skill in the art upon examination of the following figures and detailed description. All such additional systems, methods, features and advantages are defined and protected by the accompanying claims.

BRIEF DESCRIPTION OF THE FIGURES

The systems and methods for interactively presenting alternative content to a user can be better understood with reference to the following figures. The components within the figures are not necessarily to scale, emphasis instead being placed upon clearly illustrating the principles for enabling the interactive program manager. Moreover, in the figures, like reference numbers designate corresponding parts throughout the different views.

DETAILED DESCRIPTION

Figure 1:
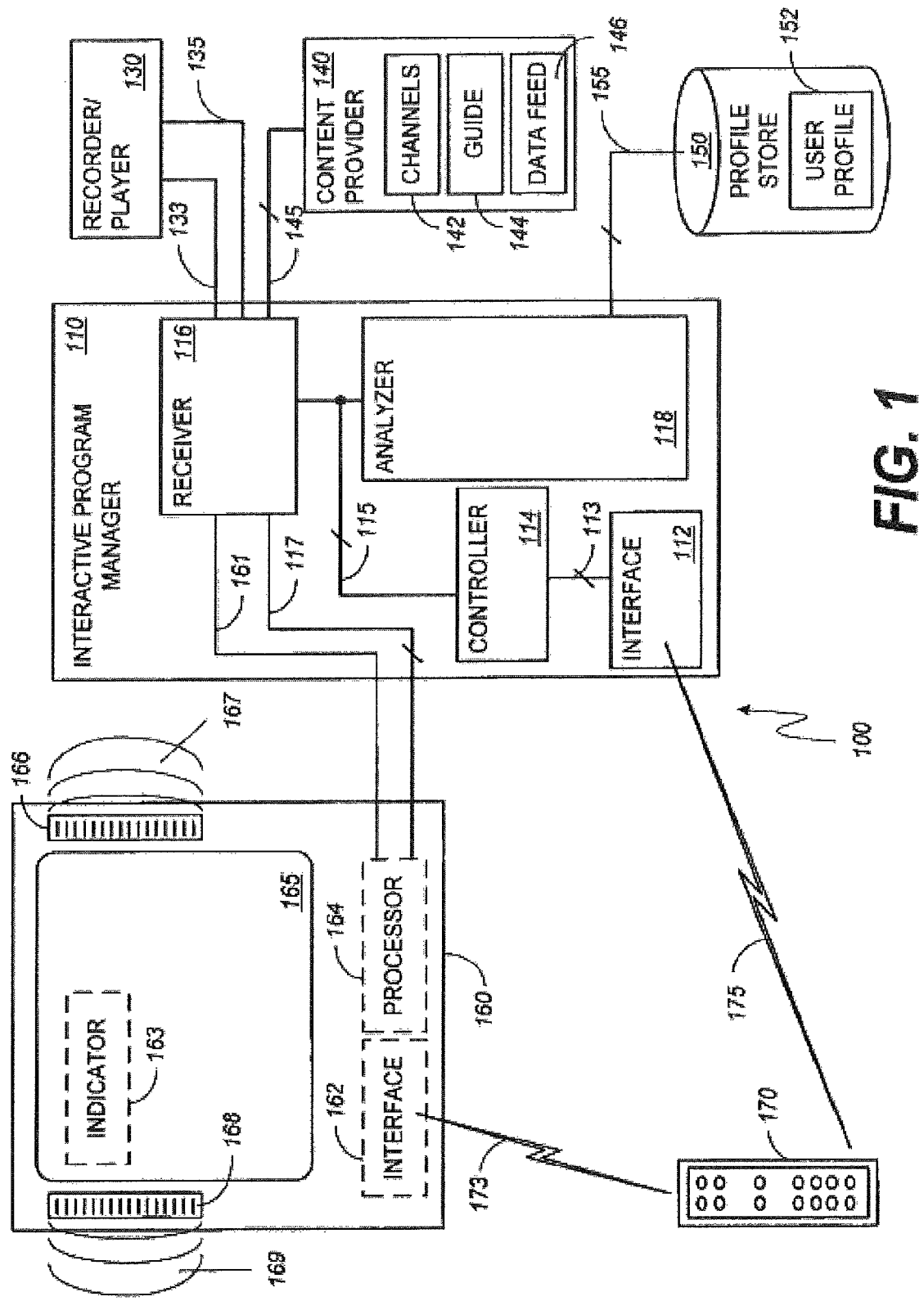
FIG. 1 is a block diagram illustrating an embodiment of a multimedia environment.

An interactive program manager provides available broadcast and non-broadcast sources to one or more select devices in a multimedia system. As those skilled in the art will appreciate an identifying code or interactive callback address for directly invoking alternative multimedia content is used to communicate the availability of the alternative content and to controllably direct the multimedia system to the original content. Details of a system and method for providing such an interactive code and call back address are described, for example, in U.S. Pat. No. 5,818,438 (the '438 patent), the contents of which are incorporated by reference. A session can be established with an interactive program manager using the interactive callback address and other information such as that described in the '438 patent, and upon completion of the session, a user can re-tune or select the original content.

According to an exemplary embodiment, an interactive program manager associates the identifying code or interactive callback address with a location at which the presently viewed programming or application will be stored. The identifying code or interactive callback address may be a program-specific code that can be used to invoke one or more programs to configure a multimedia system.

The multimedia system may include one or more auxiliary devices, such as a recorder/player and a monitor that are integrated with an interactive program manager that controllably presents a first channel to the monitor and additional information to a select device, which in some configurations includes the monitor. The interactive program manager, when enabled by a user, notifies the user when one or more opportunities exist for reconfiguring the multimedia system to present alternative program content from broadcast and non-broadcast sources. Broadcast sources may include live and previously recorded audio and video information or program content. Non-broadcast sources may include audio and video information forwarded by an auxiliary device such as a recorder/player and one or more data feeds. The one or more data feeds may include ancillary information regarding available or soon to be available program content (e.g., a program guide), information associated with program content stored on a medium that is forwarded by a recorder/player and/or information available from alternative sources external to a content provider such as information available via a publicly accessible data network.

According to an exemplary embodiment, the interactive program manager includes logic for analyzing information from a program guide and one or more data feeds in light of information stored in a user profile to identify potential program content or data that might be of interest to a user associated with the information in the user profile. According to one embodiment of the interactive program manager, a content classification hierarchy is used for classifying the content of programming events and for defining a user's particular interests defined in a user profile. The classification hierarchy is comprised of trees of subject categories of increasing specificity. This allows programming events to be classified with specificity and allows user preferences to be expressed with equal specificity, both to emphasize particular categories of interest and to exclude categories not of interest to the user. For example, rather than simply being enabled to specify an interest in "sports," a user may specify that he is interested in football and tennis but not basketball or baseball and may further express interest in particular football teams and tennis players. Thus, the interactive program manager evaluates program content according to the classification hierarchy, using user profiles defined according to the classification system. As a result, evaluations generated by the interactive program manager reflect actual user preferences much more accurately than if conventional general categories were used. Further, among multiple programs that are evaluated as being of interest to a user, the degree of specificity of the matches provides a manner of ranking those programs based on user preferences.

The use of hierarchical classification as described above enables intelligent identification of program content that will be of particular interest to a given user who is not presently tuned or otherwise configured to use, e.g., listen to or view, the content. This intelligence may be implemented to automatically record programming events of interest, to alert a user of upcoming programming events of interest, to automatically display programming events of interest as they become available, or to selectively provide programs to the user and/or a recorder. When this intelligence is coupled with metadata describing individual program segments as described above, it becomes possible to provide the user with a personalized viewing experience.

Moreover, this intelligence may be implemented to enable a user to reconfigure a multimedia system in real time to switch from a first channel to an alternative channel, record an alternative channel while continuing to view a first channel, to record a first channel while viewing an alternative channel, all while selectively monitoring one or more data feeds for additional information. This additional information may be presented in real time via one or more areas of a display. Alternatively, the additional information can be continuously monitored for select events or items, the occurrence of or inclusion of which, that trigger the interactive program manager to present corresponding information on the display.

Users are provided with a suitably configured monitor and/or one or more additional devices the combination of which comprises an interactive program manager that is configured to receive broadband signals from a content provider. According to exemplary embodiments, the interactive program manager is configured to insert an identifying code or interactive callback address either in a program signal (an in-band signal) or in an out-of-band signal. The interactive program manager is also configured to store the identity of the source or channel on which the presently viewed programming is being received in one or more storage devices. The interactive program manager is also configured to detect and store information accompanying the transmission of the identifying code or interactive callback address regarding an image to be displayed on the display device (such as a "key," "icon," or "indicator") or an audio message to be reproduced to indicate the availability of alternative content that might be of interest to a user. The interactive program manager is also coupled to a processor configured to generate a video image based on the received or pre-stored "key," "icon," or "indicator" information, or alternatively, is programmed to generate the video signal and is coupled to the display device in such a manner as to provide such a signal to that device.

Furthermore, the interactive program manager is adapted to communicate with a user via a menu presented on the display of the monitor upon receipt of a command input from the user in response to observing the indicator (i.e., seeing the "icon" or hearing the message). The menu includes one or more inputs for controllably configuring the multimedia system and/or updating the user profile. The interactive program manager may first store the identity of the channel on which the program then being viewed is being transmitted. When the program responsible for generating the menu is terminated, the interactive program manager distributes one or more channels or sources of information in accordance with various configuration parameters identified during the communication session with the user.

Having generally described the interactive program manager and methods for presenting program content, various additional embodiments will be described with respect to FIGS. 1-6B. By way of example, FIG. 1 is a block diagram illustrating an embodiment of a multimedia environment 100. Multimedia environment 100 includes monitor 160 and an interactive program manager 110 that processes program content provided by content provider 140 on its way to monitor 160. Monitor 160 includes interface 162 for receiving command inputs from one or more local controls (not shown) integrated with monitor 160 or from wireless controller 170 via link 173. Monitor 160 further includes processor 164 for receiving audio and video signal information and converting the same for presentation via display 165, right-side speaker 166, and left-side speaker 168. Processor 164 converts right-side audio information into a right-channel analog signal, which is converted into right-side audio 167 by right-side speaker 166. Processor 164 also converts left-side audio information into a left-channel analog signal, which is converted into left-side audio 169 by left-side speaker 168.

As illustrated in FIG. 1, interactive program manager 110 is coupled to content provider 140 via bus 145. Interactive program manager 110 is coupled to monitor 160 via bus 117 and audio/video link 161. Interactive program manager 110 is also coupled to profile store 150 via bus 155 and recorder/player 130 via audio/video link 133 and audio/video link 135. Wireless controller 170 communicates with one or both of monitor 160 via link 173 and interactive program manager 110 via link 175 to convey various commands and data entries from a user. As indicated in FIG. 1, wireless controller 170 communicates commands and/or data to monitor 160 via link 173 and interface 162. Similarly, wireless controller communicates commands and/or data to interactive program manager 110 via link 175 and interface 112.

Bus 145 forwards signals associated with a plurality of channels 142, program guide 144, as well as one or more optional data feeds 146. Each of the channels 142 includes audio and video information that together make up a program. Both channel information and the one or more data feeds 146 can be transmitted in analog and/or digital formats. As those skilled in the art will appreciate, closed-captioning information may be imbedded or otherwise coded into portions of an analog channel. A suitably configured decoder (not shown) integrated or otherwise coupled to monitor 160 converts the received closed-captioning information for presentation as text on display 165. Data feeds 146 may contain information generated by content provider 140 or sources external to content provider 140. Data feeds 146 are similarly processed by appropriately configured decoders or processors (not shown) integrated or otherwise coupled to one or more of interactive program manager 110 or monitor 160. Program guide 144 includes information describing presently available program content across the plurality of channels 142 and program content that will be presented in the near future.

Bus 117 forwards control signals generated within interactive program manager 110 that when decoded or otherwise interpreted by processor 164 direct monitor 160 to function in one of various operational modes. In addition, bus 117 forwards configuration information or other data entered by a user via one or both of wireless controller 170 and monitor 160. The configuration information and/or other data is received and processed by interactive program manager 110. Processing includes one or both of updating logic and/or data associated with analyzer 118 or user profile 152. Audio/video link 161 forwards analog and/or digital signals containing information from a select channel provided by content provider 140 or audio and video information from recorder/player 130 in accordance with the configuration information or data communicated to interactive program manager 110, information in user profile 152 and information in program guide 144.

As described above, one or more indicators, such as indicator 163 may be integrated within the various signals communicated via interactive program manager 110 to indicate to a user that alternative content is available. In the illustrated embodiment, indicator 163 is a visual signal that is presented on display 165. In an alternative mode of operation, an audio indicator may be communicated in the form of an audible tone or a message communicated via speaker 166 and speaker 168, or both the audio indicator and the visual indicator may be enabled.

Interactive program manager 110 comprises controller 114, receiver 116, and analyzer 118. Controller 114 is coupled to interface 112 via input bus 113. Controller 114 is further coupled to receiver 116 and analyzer 118 via command bus 115. Receiver 116 is coupled to content provider via bus 145, which contains the above-described channels 142, program guide 144, and data feeds 146. Receiver 116 is further coupled to recorder/player 130 via audio/video link 135, which provides audio/video information from the output or player portion of recorder/player 130 and audio/video link 133, which provides audio/video information from a select channel selected from the set of channels 142 provided by content provider 140 for recording by the recorder portion of recorder/player 130. Receiver 116 forwards a separate and distinct channel (i.e., different from the channel sent to recorder/player 130) selected from the set of channels 142 to monitor 160 via audio/video link 161. Analyzer 118 receives commands and configuration information from controller 114 and program guide 144 and one or more data feeds 146 via bus 145, receiver 116 and command bus 115. In addition, analyzer 118 receives user profile 152 from profile store 150 via bus 155. Analyzer 118 is configured with one or more programs for identifying program content of interest to a user that is presently available and/or may become available in the near future. Analyzer 118 compares information from program guide 144 and data feed 146 in light of information from user profile 152 to determine when alternative program content might be of interest to a user. When so directed, analyzer 118 also monitors the status of broadcast and non-broadcast program content and in response to a timer or a triggering condition reports various information related to the program to the user. In addition to monitoring program content, analyzer 118 may be directed to report when information provided via data feed 146 or alternative data sources (not shown) indicate that an alert condition exists.

In the illustrated embodiment, interactive program manager 110 and profile store 150 are separate devices. It should be understood that the functions provided interactive program manager 110 and profile store 150 could be integrated or otherwise combined with monitor 160 or some other device such as a computing device, a set top box, or some other device communicatively coupled to monitor 160 and content provider 140 (not shown). For that matter, although the example embodiment depicts the interactive program manager 110 as a separate and distinct device among others shown in the multimedia system, it should be appreciated that one or more functional blocks of the interactive program manager 110 may be integrated with monitor 160, recorder/player 130 or perhaps other devices communicatively coupled to these or other devices at a user premise. For example, analyzer 118 and user profile 152 could be integrated and supplied as an enhanced interactive service by content provider 140.

Figure 2:
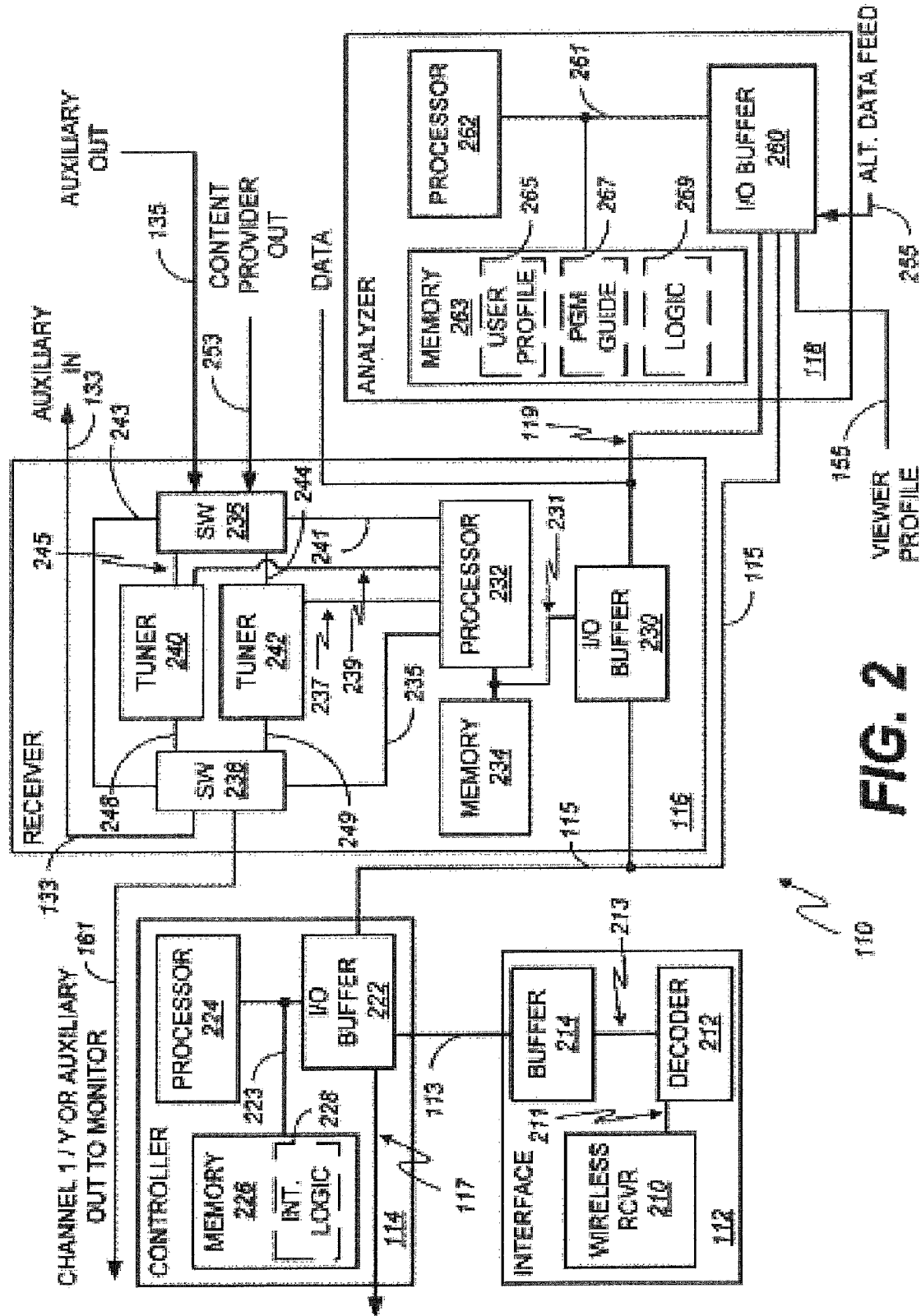
FIG. 2 is a schematic diagram illustrating an embodiment of the interactive program manager of FIG. 1.

FIG. 2 is a schematic diagram illustrating an embodiment of the interactive program manager 110 of FIG. 1. Interface 112 includes wireless receiver 210, decoder 212 and output buffer 214. Wireless receiver 210 is coupled to decoder 212 via connection 211. Decoder 212 is further coupled to output buffer 214 via connection 213. Interface 112 receives commands issued by a user via wireless controller 170. Wireless receiver 210 receives and forwards the various encoded commands to decoder 212, which transforms the information into a command that can be interpreted by controller 114. Output buffer 214 receives the decoded or transformed command information and forwards the same via connection 113 to controller 114 for further processing.

Controller 114 includes I/O buffer 222, processor 224 and memory 226. I/O buffer 222, processor 224 and memory 226 are communicatively coupled via local bus 223. I/O buffer 222 receives command information from interface 113 and in accordance with interface logic 228 stored in memory 226 as executed by processor 224 forwards commands and information to receiver 116, analyzer 118 and/or monitor 160 (FIG. 1) via command bus 115. In addition, I/O buffer 222 is further coupled to monitor 160 via bus 117.

Receiver 116 includes I/O buffer 230, processor 232, memory 234, switch 236, switch 238, tuner 240 and tuner 242. I/O buffer 230, processor 232 and memory 234 are communicatively coupled via local bus 231. Processor 232 is coupled to switch 236 and switch 238 via connections 241 and 235, respectively. Processor 232 is further coupled to tuner 240 and tuner 242 via connection 239 and connection 237, respectively. Switch 236 has a first input configured to receive audio and video information via audio/video link 135. Switch 236 has a second input configured to receive multiple channels from a content provider via link 253. Switch 236 is configured with three outputs. A first output coupled to link 243 bypasses the tuners. A second output coupled to link 245 directs the multiple channels to tuner 240. A third output coupled to link 244 directs the multiple channels to tuner 242. Tuner 240 in accordance with one or more control commands provided by processor 232 selectively forwards the audio and video information associated with one of the received channels via link 248 to switch 238. Tuner 242 in accordance with one or more control commands provided by processor 232 selectively forwards the audio and video information associated with a different channel via link 249 to switch 238. Switch 238 is configured with three inputs and two outputs. A first input coupled to link 243 receives audio and video information from switch 236 via link 243. A second input coupled to link 248 receives the audio and video information associated with a selected channel from tuner 240. A third input coupled to link 249 receives the audio and video information associated with the alternative or different channel from tuner 242. A first output of switch 238 is coupled to audio/video link 133, which may be applied to an input of an auxiliary device such as the recorder/player 130 introduced in FIG. 1. A second output of switch 238 is coupled to audio/video link 161, which is coupled to monitor 160 (FIG. 1).

In the embodiment illustrated in FIG. 2, receiver 116 also receives one or more data feeds from content provider 140 (FIG. 1) along bus 119. Information provided by content provider 140 in the data feeds may be buffered by I/O buffer 230 and forwarded to analyzer 118 to assist in determining when alert conditions exist or otherwise monitoring the progress of program content.

Analyzer 118 includes I/O buffer 260, processor 262 and memory 263. I/O buffer 260, processor 262 and memory 263 are communicatively coupled via local bus 261. I/O buffer 260 receives command information from command buffer 115, user profile information from bus 155, content provider data including a program guide and possibly one or more data feeds via bus 119. In addition, I/O buffer 260 may receive one or more alternative data feeds via bus 255. These alternative data feeds can include information available from one or more information servers coupled to a publicly accessible or a privately accessible data network (not shown). I/O buffer 260 receives the command information, user profile information, program guide information and one or more data feeds and in accordance with logic 269 stored in memory 263 as executed by processor 262 forwards notices of triggering conditions and alerts to controller 114, which is configured to communicate information to the user in response to the triggering conditions and/or alerts. Memory 263 may include one or more user profiles such as user profile 265 and one or more program guides 267 as may be desired.

In the example embodiment illustrated in FIG. 2, controller 114, receiver 116 and analyzer 118 each contain respective I/O buffers, local busses, memories and processors. It should be understood that in alternative embodiments, controller 114, receiver 116 and analyzer 118 may be integrated in a single computing device. When configured as illustrated, local bus 223, local bus 231 and local bus 261 may be wired or wireless connections, as known in the art. In addition each local bus may have additional elements, which are omitted for simplicity, such as caches, drivers, repeaters, and receivers, to enable communications. Further, each local bus may include address, control, and/or data connections to enable appropriate communications among the respective I/O buffers, processors and memories. Processor 224, processor 232 and processor 262 are hardware devices for executing software, particularly that stored in memory 226, memory 234 and memory 263, respectively. Each of the processors can be any custom made or commercially available processor, a central processing unit (CPU), a semiconductor based microprocessor (in the form of a microchip or chip set), or generally any device for executing software instructions. Each of the memories can include any one or combination of volatile memory elements (e.g., random-access memory (RAM, such as dynamic random-access memory (DRAM), static random-access memory (SRAM), synchronous dynamic random-access memory (SDRAM), etc.) and nonvolatile memory elements (e.g., read-only memory (ROM), among other elements or devices. Moreover, each of the memories may incorporate electronic, magnetic, optical, and/or other types of storage media. Note that the memories can have a distributed architecture, where various components are situated remote from one another, but can be accessed by each of the respective processors.

The logic stored in each of memory 226, memory 234 and memory 263 may include one or more separate programs, each of which comprises an ordered listing of executable instructions for implementing logical functions in addition to identified locations for data storage. The programs can be source programs, executable programs (object code), scripts, or any other entities comprising a set of instructions to be performed. When implemented as source programs, the programs are translated via a compiler, assembler, interpreter, or the like, which may or may not be included within the respective memories, so as to operate properly in connection with the processor and/or an associated operating system. Furthermore, the logic stored in each of memory 226, memory 234 and memory 263 can be written in one or more object-oriented programming languages, which have classes of data and methods, or procedure programming languages, which have routines, subroutines, and/or functions.

Moreover, logic stored in each of memory 226, memory 234 and memory 263 can be stored on any computer-readable medium for use by or in connection with any computer related system or method. In alternative embodiments, one or more of the programs can implemented with any or a combination of the following technologies, which are each well known in the art: a discrete logic circuit(s) having logic gates for implementing logic functions upon data signals, an application-specific integrated circuit (ASIC) having appropriate combinational logic gates, a programmable gate array(s) (PGA), a field-programmable gate array (FPGA), etc.

Figure 3:
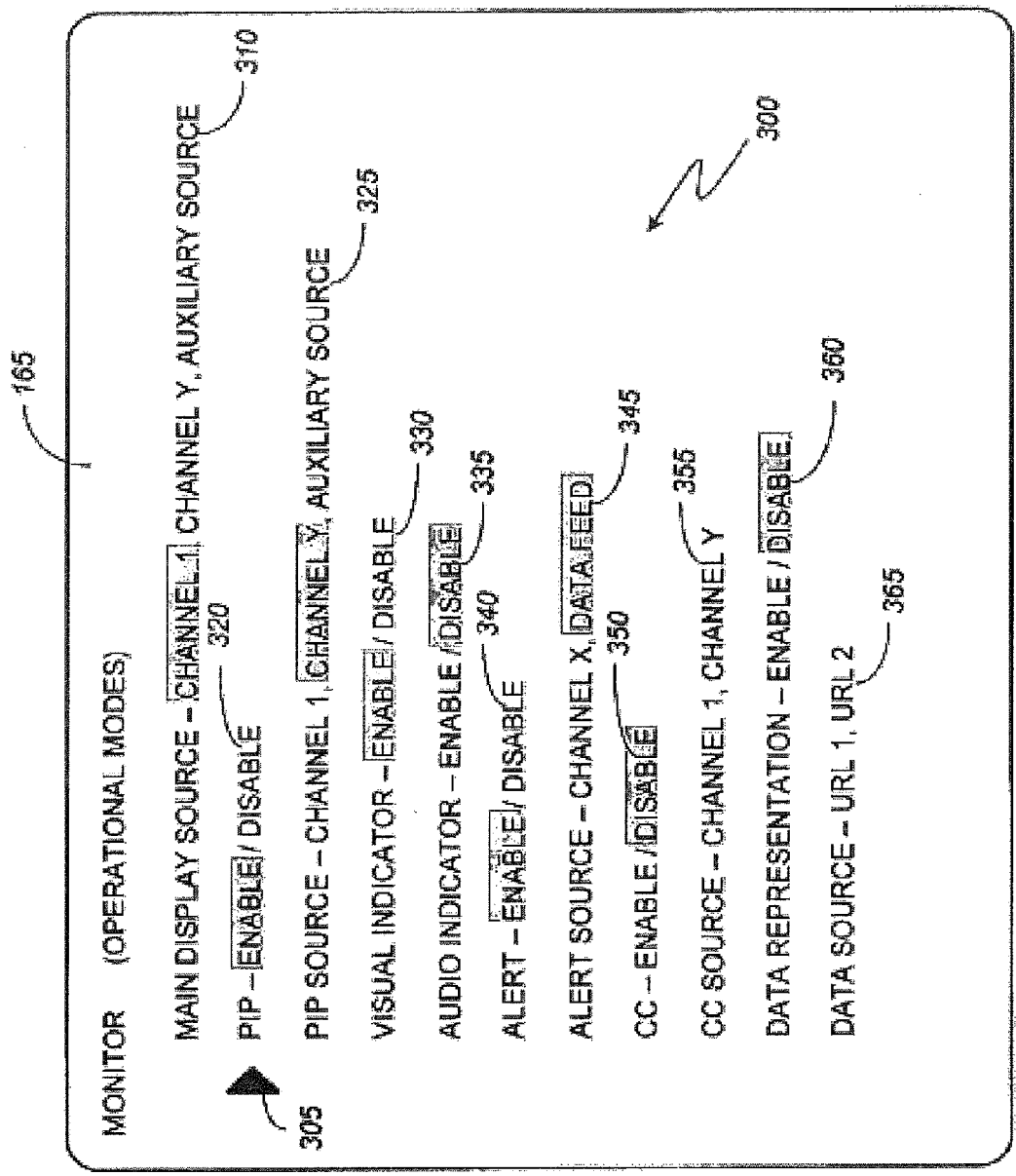
FIG. 3 is a schematic diagram illustrating multiple embodiments of various operating modes of the monitor of FIG. 1.

FIG. 3 is a schematic diagram illustrating a menu 300 containing multiple user controllable inputs that together define embodiments of various operating modes of the monitor 160 of FIG.1. The example set of user controllable inputs includes controls for selectively enabling or disabling visual and audio indicators, picture-in-picture, alert(s), closed-captioning, as well as other data representations. In addition, the example set of user controllable inputs includes controls for selecting the source for display 165, a picture-in-picture window, an alert window, a closed-captioning information window, as well as a data representation window. The example menu 300 is generated by interface logic 228 and presented by monitor 160 on display 165. Edit indicator 305 defines a select input to modify. Edit indicator 305 is controllably directed up or down through the list of inputs via one or both of control inputs associated with wireless controller 170 and a control interface associated with monitor 160 (FIG. 1). In addition each of the input items in menu 300 includes a highlight bar indicative of the present selection for that particular input item. The highlight bar is controllably directed left or right through the list of possible selections (e.g., channels, data feeds, uniform resource locator or enable/disable) associated with the input item via one or both of control inputs associated with wireless controller 170 and a control interface associated with monitor 160 (FIG. 1).

In the example embodiment illustrated in FIG. 3, menu 300 includes main display source 310, picture-in-picture enable/disable 320, picture-in-picture source 325, visual indicator enable/disable 330, audio indicator enable/disable 335, alert enable/disable 340, alert source 345, closed-captioning enable/disable 350, closed-captioning source 355, data representation enable/disable 360, and data source 365 input items.

The highlight bar associated with the main display source 310 input indicates that "channel 1" is the selected source. As further indicated in FIG. 3 main display source 310 includes selection items "Channel Y" and "Auxiliary Source" as possible alternative sources for video and/or audio information for presentation on display 165 of monitor 160. The highlight bar associated with picture-in-picture enable/disable 320 indicates that picture-in-picture is enabled or on. The highlight bar associated with the picture-in-picture source 325 input indicates that "channel Y" is the selected source. As further indicated in FIG. 3 picture-in-picture source 325 includes selection items "Channel 1" and "Auxiliary Source" as possible alternative sources for video information for presentation within a picture-in-picture window on display 165 of monitor 160. The highlight bar associated with visual indicator enable/disable 330 indicates that the visual indicator is enabled or on. The highlight bar associated with audio indicator enable/disable 335 indicates that the audio indicator is disabled or off. The highlight bar associated with alert enable/disable 34 indicates that the alert input is enabled or on. The highlight bar associated with the alert source 345 input indicates that "Data Feed" is the selected source. As further indicated in FIG. 3 alert source 345 includes selection item "Channel X" as a possible alternative source for video information for presentation within an alert window on display 165 of monitor 160. The highlight bar associated with closed captioning enable/disable 350 input indicates that the closed captioning input is disabled or off. As a result of the closed captioning being selectively disabled, closed captioning source 355 does not contain a highlight bar. When closed captioning is enabled, closed captioning source 355 includes selection items "Channel 1" and "Channel Y." The highlight bar associated with the data representation enable/disable 360 input indicates that the data representation input is disabled or off. As a result of the data representation being selectively disabled, data source 365 does not contain a highlight bar. When data representation is enabled, data source 365 includes "URL 1" and "URL 2."

Interactive program manager 110 can be configured to generate one or more alternative menus for presentation to a user with more or less user selectable configuration items than those presented in the illustrated embodiment. For example, an audio alert input that overrides the audio portion of the main display source when an alert condition is identified, a picture-in-picture audio select input that overrides the audio portion of the main display source with audio information from the picture-in-picture source and one or more additional data items may be added to further select and/or identify both the source associated with the data representation input and the alert input. Menu 300 may also be configured to provide an interface for defining information that will be used to trigger the alert and/or update the data representation.

Figure 4:
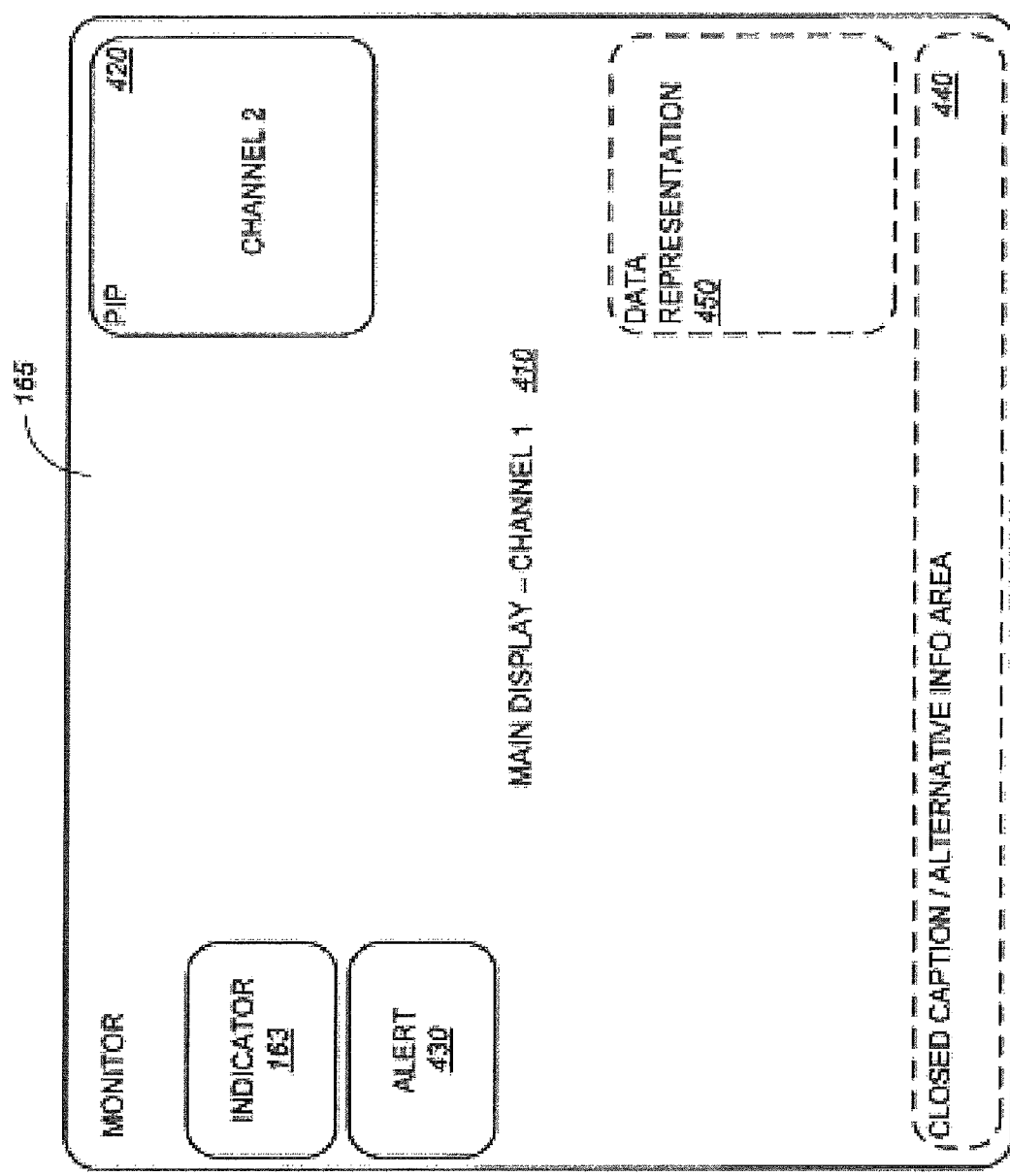
FIG. 4 is a schematic diagram illustrating an embodiment of an operating mode of the monitor of FIG. 1.

FIG. 4 is a schematic diagram illustrating an embodiment of an operating mode of the monitor 165 of FIG. 1. The operating mode illustrated in FIG. 4 presents the video content from channel 1 in the background 410 of display 165 and a host of other items in select areas of the foreground. For example, die video information from channel 2 is presented in picture-in-picture window 420. By way of further example, alert information provided by a local broadcast channel as distributed by content provider 140 or some other source or an alternative data feed is presented in alert window 430. In addition, indicator 163 (in its visual form) is presented in indicator window 163. Alternatively, closed captioning information or alternative text messages may be presented in closed caption/alternative information window 440 and a data representation of information provided via a data stream is selectively presented in data representation window 450. The example operating mode illustrated in FIG. 4 is just one of many possible arrangements that can be generated via the interactive program manager 110 and monitor 160. For example, alternative embodiments may include changing the location of one or more of the windows. In addition, one or more items may be integrated or otherwise arranged to share a select area of display 165.

Figure 5:
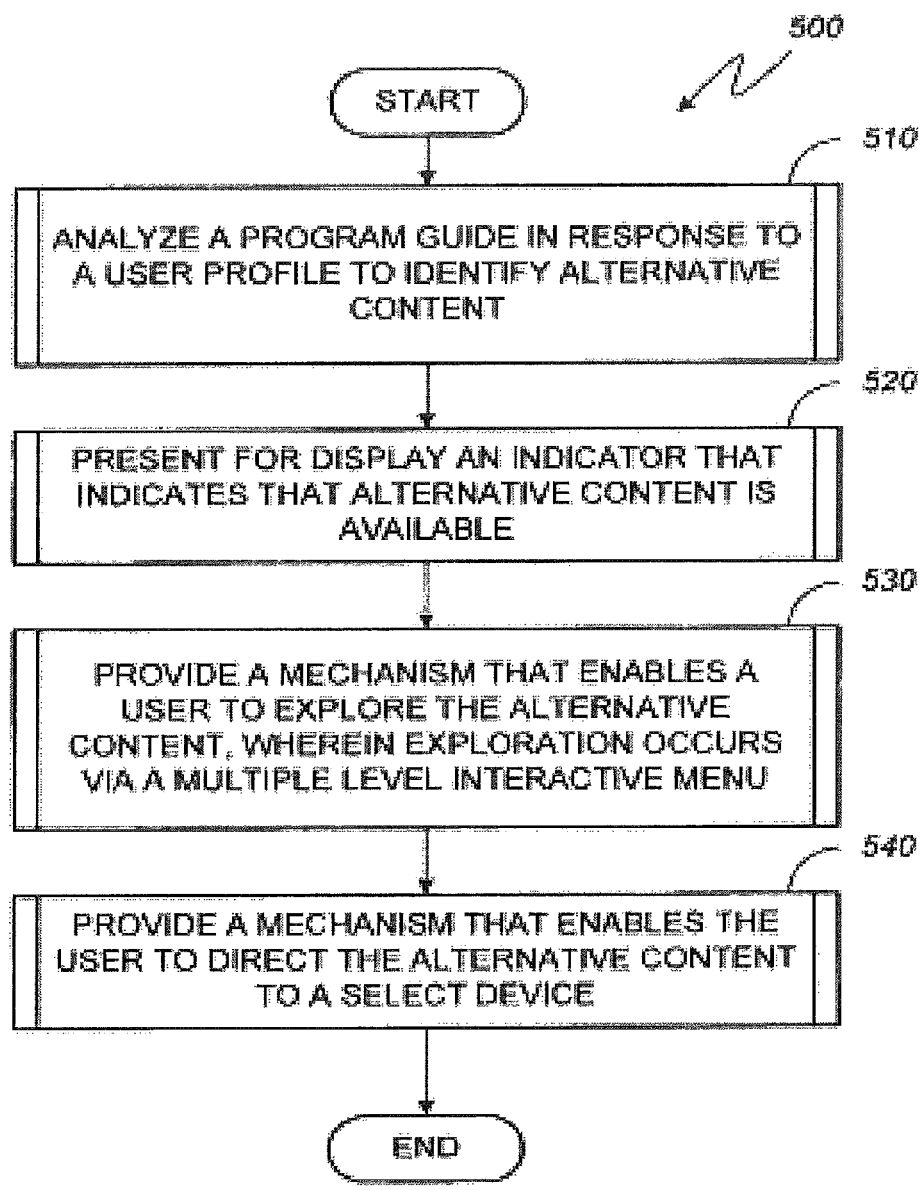
FIG. 5 is a flow diagram illustrating an embodiment of a method for interactively presenting alternative content.

FIG. 5 is a flow diagram illustrating an embodiment of a method 500 for interactively presenting alternative content. In this regard, each block represents a specified step or function. When embodied in software and/or hardware/firmware, each block represents a module, segment, or portion of code, which comprises one or more executable instructions for implementing the specified function(s). Method 500 begins with block 510 where interactive program manager 110 analyzes a program guide in response to information provided in a user profile to identify alternative content. In block 520, interactive program manager 110 presents for display an indicator that indicates that alternative content is available to the user. In block 530, the interactive program manager 110 provides a mechanism that enables the user to explore the identified alternative content. Thereafter, as indicated in block 540, the interactive program manager 110 provides a mechanism that enables the user to controllably direct the alternative content to a select device.

These mechanisms may comprise both software and/or hardware/firmware configured to present a layered or hierarchical menu to a user through one or more interfaces associated with wireless controller 170, monitor 160 or interactive program manager 110. In operation, the mechanism prompts or otherwise communicates with the user to determine whether the user would like to continue viewing the present program only, continue viewing the present program while recording the alternative content, continue viewing the present program while monitoring the alternative content, switch to the view the alternative content, switch to view the alternative content while recording the original program, and/or change the operating mode of monitor 160 in some manner. As described above, operating modes include selection of a main display source, picture-in-picture enable/disable, picture-in-picture source (when picture-in-picture is enabled), visual indicator enable/disable, audio indicator enable/disable, alert enable/disable, alert source (when alert is enabled), closed captioning service enable/disable, closed captioning source (when closed captioning is enabled), data representation enable/disable, and data source (when data representation is enabled).

Figure 6A:
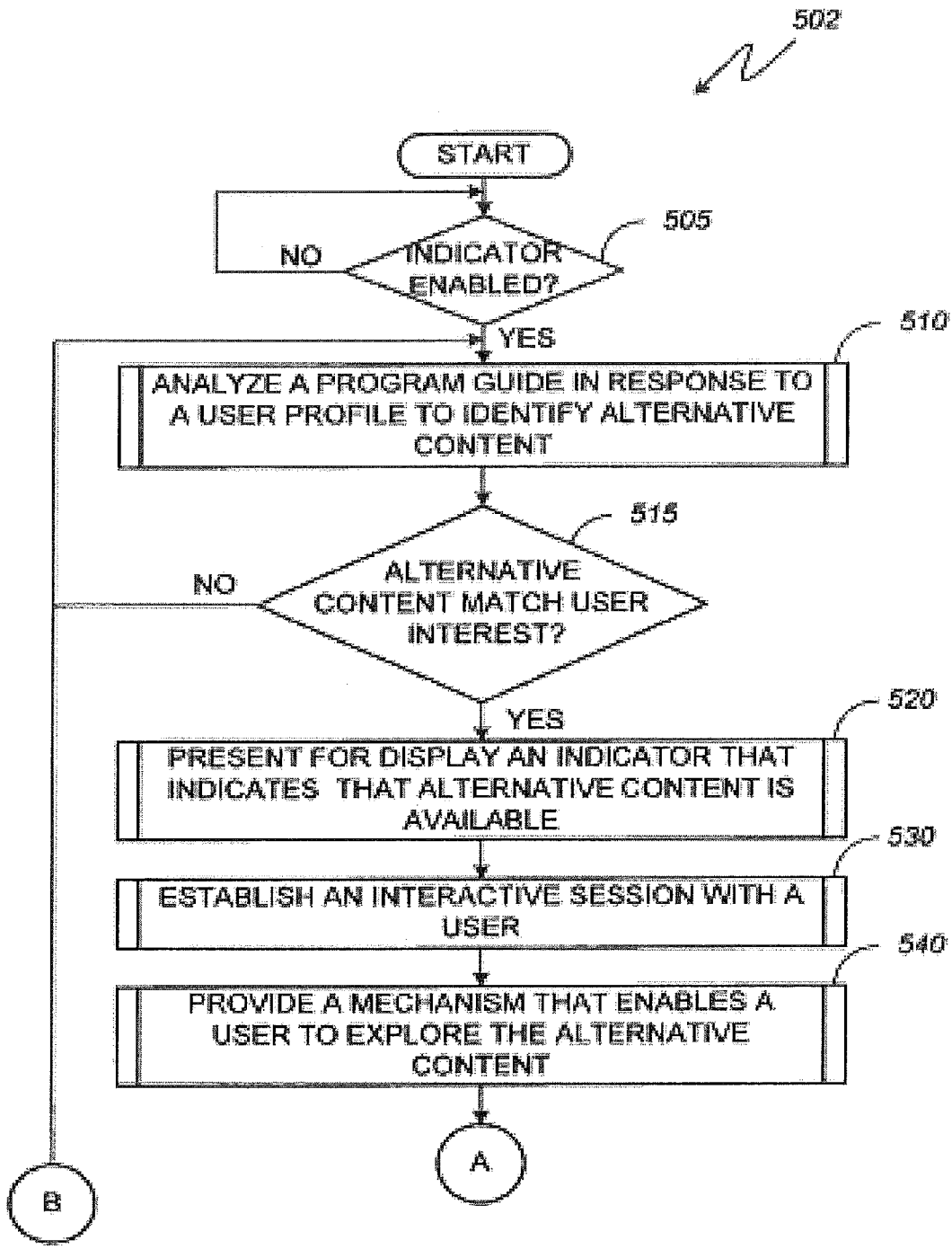
FIG. 6A is a flow diagram illustrating an alternative embodiment of a method for interactively presenting alternative content to a user.
Figure 6B:
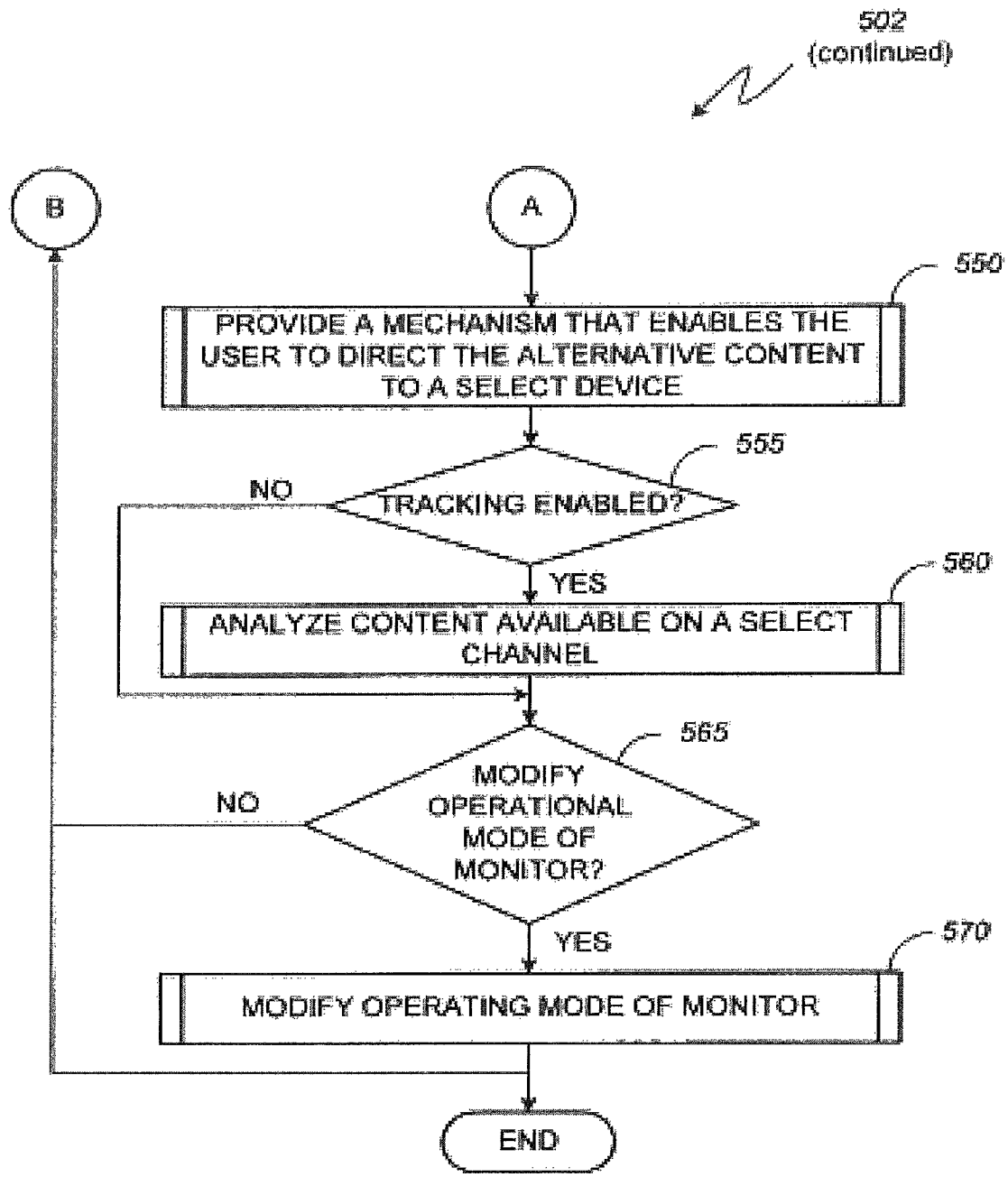
FIG. 6B is a flow diagram further illustrating the method of FIG. 6A.

FIGS. 6A-6B are flow diagrams illustrating an alternative embodiment of a method 502 for interactively presenting alternative content to a user. In this regard, each block represents a specified step or function. When embodied in software and/or hardware/firmware, each block represents a module, segment, or portion of code, which comprises one or more executable instructions for implementing the specified function(s). Method 502 begins with decision block 505 where a determination is made regarding the status of an indicator. When a user is interested in knowing what alternative content might be presently available or available at a select time in the future and has enabled the indicator, processing continues with block 510 as indicated by the flow control arrow labeled, "Yes," exiting decision block 505. Otherwise, when a user is not interested in alternative content and has not enabled the indicator, as shown by the flow control arrow labeled, "No," exiting decision block 505, processing may resume at the start. It should be understood that in most embodiments execution of method 502 may be paused for a period of time before repeating the determination in decision block 505.

Method 502 continues with block 510 where interactive program manager 110 analyzes a program guide in response to information provided in a user profile to identify alternative content. In decision block 515 a determination is made whether alternative content identified by the programming guide or an alternative data source matches a possible user interest. When alternative content matches a user interest, processing continues with block 520 as indicated by the flow control arrow labeled, "Yes," exiting decision block 515. Otherwise, when alternative content does not match a user interest, as shown by the flow control arrow labeled, "No," exiting decision block 515, processing resumes after decision block 505.

Method 502 continues with block 520 where interactive program manager 110 presents for display an indicator that indicates that alternative content is available to the user. In block 530, the interactive program manager 110 establishes an interactive session with a user. As indicated in block 540, during the interactive session, the interactive program manager 110 provides a mechanism that enables the user to explore the alternative content. As indicated in FIGS. 6A and 6B connector "A" links block 540 with block 550, where the interactive program manager 110 provides a mechanism that enables the user to direct the alternative content to a select device.

Thereafter, in decision block 555 a query is made to determine whether a tracking flag is enabled. The tracking flag is enabled when a user is interested in knowing what is occurring on an available but not selected channel or data source. When the tracking flag is enabled as indicated by the flow control arrow labeled, "Yes" exiting decision block 555 processing continues with block 560. As indicated in block 560, interactive program manager 110 analyzes content available on a select channel. In this case, the select channel is one of a data feed or an audio/video program that is not presently being forwarded to monitor 160 for presentation to a user. Otherwise, when tracking is not enabled, as indicated by the flow control arrow labeled, "No" exiting decision block 555 processing continues with decision block 565. In decision block 565 a query is presented to the user whether to modify an operational mode of monitor 160. When the response to the query associated with decision block 565 is affirmative, as indicated by the flow control arrow labeled "Yes" exiting decision block 565, processing continues with block 570 where the operational mode of monitor 160 is changed. Otherwise, when the response to the query associated with decision block 565 is negative, processing returns to block 510 via connector "B." That is, connector "B" bridges the second portion of method 502 as illustrated in FIG. 6B with the first portion of method 502 illustrated in FIG. 6A. As further illustrated by the flow diagram of FIG. 6B, after the operational mode of monitor 160 is modified in block 570, processing may also return to block 510. Otherwise, one or more criteria may be applied in a making a determination to terminate method 502.

In operation, the interactive program manager 110, as indicated in blocks 540 and 550, prompts or otherwise communicates with the user to determine whether the user would like to continue viewing the present program, continue viewing the present program while recording the alternative content, continue viewing the present program while monitoring the alternative content, switch to the view the alternative content, switch to view the alternative content while recording the original program, and/or change the operating mode of monitor 160 in some manner. As described above, operating modes include selection of a main display source, picture-in-picture enable/disable, picture-in-picture source (when picture-in-picture is enabled), visual indicator enable/disable, audio indicator enable/disable, alert enable/disable, alert source (when alert is enabled), closed captioning service enable/disable, closed captioning source (when closed captioning is enabled), data representation enable/disable, and data source (when data representation is enabled). Operating modes may also include listening to audio programming only, the audio portion of a select channel of multimedia content, recorded audio material and the like.

Operational software programs that may be used by interactive program manager 110, as well as operational software that may be used in conjunction with controllers, monitors, computers, among other devices that interface with system 100, which comprise an ordered listing of executable instructions for implementing logical functions, can be embodied in any computer-readable medium for use by or in connection with an instruction execution system, apparatus, or device, such as a computer-based system, processor-containing system, or other system that can fetch the instructions from the instruction execution system, apparatus, or device and execute the instructions.

In the context of this document, a "computer-readable medium" can be any means that can contain, store, communicate, propagate, or transport the program for use by or in connection with the instruction execution system, apparatus, or device. The computer-readable medium can be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection (electronic) having one or more wires, a portable computer diskette (magnetic), a RAM, a ROM, an erasable programmable read-only memory (EPROM or Flash memory) (magnetic), an optical fiber (optical), and a portable CDROM (optical). Note that the computer 364 readable medium could even be paper or another suitable medium upon which the program is printed and the program can be electronically captured, via for instance, optical scanning of the paper or other medium, then compiled, interpreted or otherwise processed in a suitable manner if necessary, and then stored in a computer memory.

While various embodiments of the systems and methods for enabling an interactive program manager have been described, it will be apparent to those of ordinary skill in the art that many more embodiments and implementations are possible that are within the scope of the accompanying claims. Accordingly, the systems and methods for enabling an interactive program manager are not to be restricted beyond the attached claims and their equivalents.

What is claimed is:

1. A system comprising:
a processor; and
memory storing instructions that are executable by the processor to cause the processor to perform operations comprising:
identifying, based on a user profile associated with a particular user, content of interest to the particular user, wherein the content of interest is associated with a first source;
sending a notification indicator to a first device in response to identifying the content of interest; and
in response to user input responsive to the notification indicator, sending a menu display to the first device, the menu display including a first user selectable option to view a submenu, wherein the submenu comprises an option to selectively enable display of an alert associated with the first source and wherein the alert is displayable on the first device in conjunction with display of a first program.

2. The system of claim 1, wherein the operations further comprise:
sending the first program to the first device, the first program associated with a first channel of a plurality of channels; and
prior to sending the notification indicator, monitoring the first source to identify the content of interest based on the user profile.

3. The system of claim 1, wherein the operations further comprise sending the alert to the first device in response to an alert condition and in response to the user profile indicating that display of the alert is enabled.

4. The system of claim 1, wherein the menu display includes a second user selectable option to send particular content to the first device, a third user selectable option to send the particular content to the first device and to send the first program to a recording device, and a fourth user selectable option to forward the particular content to the recording device while continuing to send the first program to the first device.

5. The system of claim 4, wherein the operations further comprise, in response to a user selection of the second user selectable option, monitoring the first program based on the user profile to determine when the first program includes second content of interest.

6. The system of claim 1, wherein the operations further comprise, in response to a user selection of the notification indicator, storing an interactive callback address that includes a location of a source of the first program.

7. The system of claim 1, wherein the operations further comprise sending a second alert to the first device when alert data of a data feed indicates a second alert condition and the user profile indicates an alert enabled mode.

8. A method comprising:
sending a first program associated with a first channel of a plurality of channels to a display device from a media device;
analyzing, at the media device, data of a program guide based on a user profile associated with a particular user to identify content of interest for the particular user, wherein the content of interest is associated with a second channel of the plurality of channels;
presenting, from the media device, an indicator in response to identifying the content of interest; and
in response to user input corresponding to the indicator, sending a menu from the media device to the display device, the menu including a first user selectable option to view a submenu, wherein the submenu comprises an option to selectively enable display of an alert associated with the second channel and wherein the alert is displayable on the display device in conjunction with the first program associated with the first channel.

9. The method of claim 8, further comprising evaluating the user profile to identify an indicator mode of a plurality of indicator modes, wherein the indicator is presented in accordance with the indicator mode.

10. The method of claim 9, wherein the indicator modes comprise an audio mode, a visual and audio mode, and a visual mode.

11. The method of claim 8, wherein analyzing the data of the program guide based on the user profile comprises applying a content classification hierarchy included in the user profile to the data of the program guide.

12. The method of claim 8, wherein the menu includes a second user selectable option that causes particular content to be sent to the display device, a third user selectable option that causes the first program to be recorded and that causes the particular content to be sent to the display device, and a fourth user selectable option that causes the first program and the particular content to be sent simultaneously to the display device.

13. The method of claim 8, wherein analyzing data of the program guide includes finding a match between content provided on a program associated with the second channel and a user interest indicated in the user profile, and wherein the content of interest includes the program.

14. The method of claim 8, wherein the menu includes a second user selectable option to send a data feed to the display device for display in a window.

15. The method of claim 8, further comprising establishing an interactive session with a user in response to a command from a control device after receiving the user input corresponding to the indicator.

16. The method of claim 8, further comprising sending a second alert to the display device when alert data of a data feed indicates a second alert condition and the user profile indicates an alert enabled mode.

17. The method of claim 8, wherein the menu includes a second user selectable option to apply a text stream over a portion of the display device.

18. A computer readable storage device storing instructions that, when executed by a processor, cause the processor to perform operations comprising:
sending a first program associated with a first channel of a plurality of channels to a display device;
identifying, based on a user profile associated with a particular user, content of interest to the particular user, the content of interest associated with a second channel of the plurality of channels;
presenting an indicator in response to identifying the content of interest; and
sending a menu to the display device in response to user input corresponding to the indicator, the menu including a first user selectable option to view a submenu, wherein the submenu comprises an option to selectively enable display of an alert associated with the second channel, and wherein the alert is displayable on the display device in conjunction with the first program.

19. The computer readable storage device of claim 18, wherein the operations further comprise evaluating the user profile to identify an indicator mode of a plurality of indicator modes, wherein the indicator is presented in accordance with the indicator mode.

20. The computer readable storage device of claim 18, wherein the operations further comprise sending a second alert to the display device when alert data of a data feed indicates a second alert condition and the user profile indicates an alert enabled mode.

* * * * *